US008004981B2

(12) United States Patent  
Bergamasco et al.

(10) Patent No.: US 8,004,981 B2
(45) Date of Patent: Aug. 23, 2011

(54) METHODS AND DEVICES FOR THE COORDINATION OF FLOW CONTROL BETWEEN A TCP/IP NETWORK AND OTHER NETWORKS

(75) Inventors: Davide Bergamasco, Mountain View, CA (US); Deepak Sharma, Kanpur (IN); Rajesh R A, Karnataka (IN); Silvano Gai, San Jose, CA (US); Vibin P. Thomas, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1331 days.

(21) Appl. No.: 10/463,362

(22) Filed: Jun. 17, 2003

(65) Prior Publication Data

US 2005/0141419 A1    Jun. 30, 2005

(51) Int. Cl.
H04L 12/28 (2006.01)
(52) U.S. Cl. ........................................ 370/231; 370/413
(58) Field of Classification Search .......... 370/229–240, 370/253
See application file for complete search history.

(56) References Cited

U.S. PATENT DOCUMENTS

| | | | | |
|---|---|---|---|---|
| 5,734,654 | A * | 3/1998 | Shirai et al. | 370/396 |
| 6,252,851 | B1 * | 6/2001 | Siu et al. | 370/236 |
| 6,438,101 | B1 * | 8/2002 | Kalampoukas et al. | 370/229 |
| 6,535,482 | B1 * | 3/2003 | Hadi Salim et al. | 370/229 |
| 6,882,624 | B1 * | 4/2005 | Ma | 370/236.1 |
| 6,915,456 | B2 * | 7/2005 | Banerjee et al. | 714/39 |
| 6,925,060 | B2 * | 8/2005 | Mangin | 370/237 |
| 6,970,942 | B1 * | 11/2005 | King et al. | 709/238 |
| 7,009,956 | B2 * | 3/2006 | Heinonen et al. | 370/338 |

FOREIGN PATENT DOCUMENTS

WO    WO 01/86912    11/2001

OTHER PUBLICATIONS

J. Heinanen, et al, "A Two Rate Three Color Market", RFC 2698, University of Pennsylvania, Sep. 1999. pp. 1-5.
J. Heinanen, "A Single Rate Three Color Marker", RFC 2697, University of Pennsylvania, Sep. 1999. pp. 1-6.
Canadian Office Action dated Feb. 13, 2008 from corresponding Canadian Application No. 2,521,461, 4 pages.
Chinese First Office Action dated Jul. 4, 2008 from corresponding Chinese Application No. 200480010825.6, 13 pages.
CN Second Office Action dated Sep. 4, 2009, from CN Application No. 200480010825.6.
CN Rejection Decision dated Jan. 8, 2010, from CN Application No. 200480010825.6.

* cited by examiner

*Primary Examiner* — Kwang B Yao
*Assistant Examiner* — Alex Skripnikov
(74) *Attorney, Agent, or Firm* — Weaver Austin Villeneuve & Sampson LLP

(57) ABSTRACT

Methods and devices are provided for implementing flow control coordination in a gateway between a TCP/IP network and a second network. The second network may be any type of network, including another TCP/IP network. In some implementations, the throughput of the TCP/IP network is controlled by modifying the round trip time observed by a TCP connection. In other implementations, the throughput of the TCP/IP network is controlled by modifying the size of the TCP window.

31 Claims, 16 Drawing Sheets

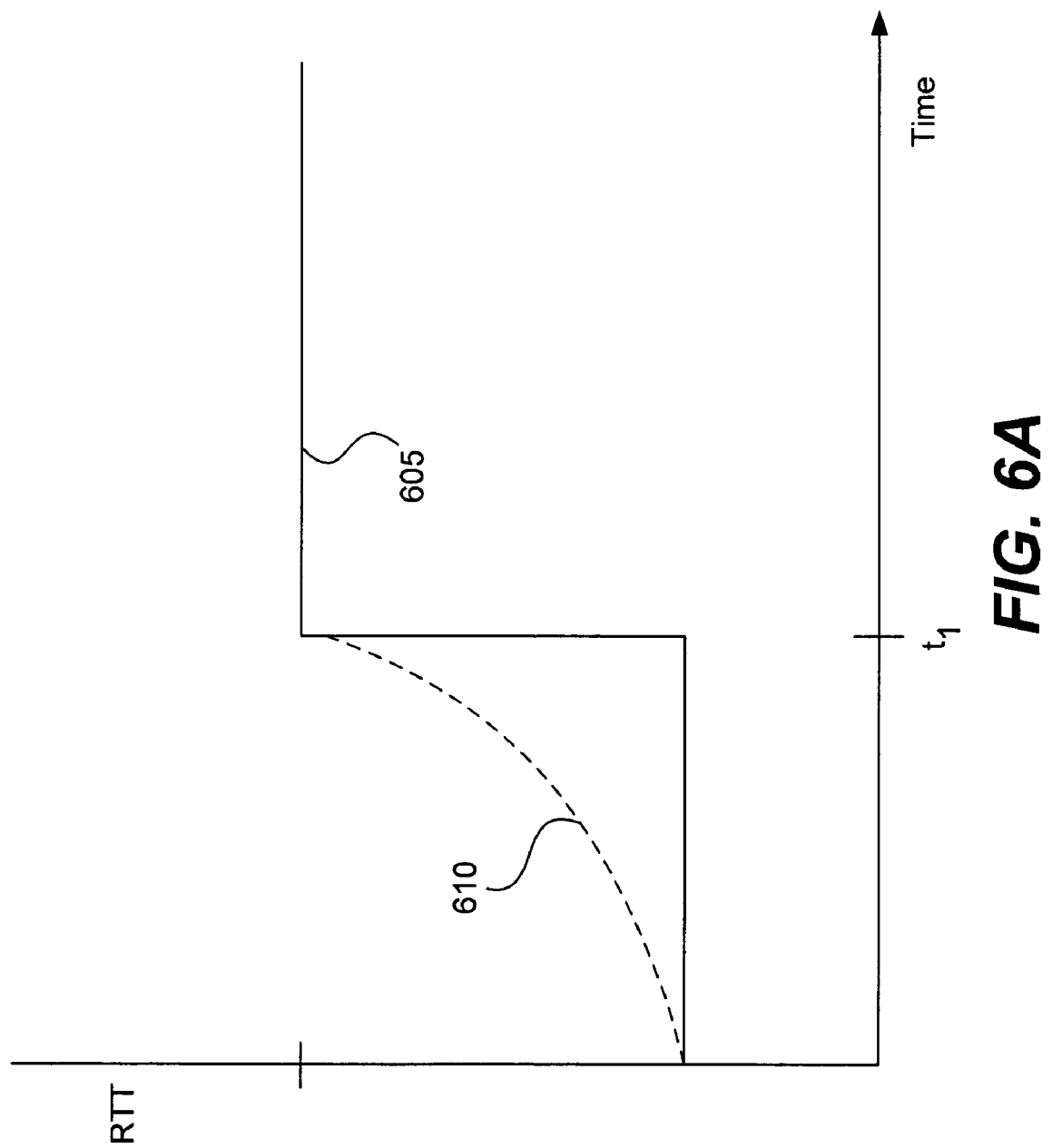

METHODS AND DEVICES FOR THE COORDINATION OF FLOW CONTROL BETWEEN A TCP/IP NETWORK AND OTHER NETWORKS

BACKGROUND OF THE INVENTION

1. Field of the Invention

The present invention relates to network technology. More particularly, the present invention relates to flow control coordination between a network using TCP/IP protocol and one or more other networks which may be using another protocol.

2. Description of the Related Art

It has become increasingly common to link networks together via a "gateway," which is typically a specially configured network device such as a router. In one example, network 105 of FIG. 1 is a TCP/IP network and network 110 is a Fibre Channel ("FC") network. Gateway 115 is an interface between networks 105 and 110.

It can be challenging to control the flow of packets across gateway 115, e.g., packets transmitted between network 110 and network 105. (As used herein, the terms "frame" and "packet" will be used synonymously.) Controlling traffic on link 112 between gateway 115 and network 105 is not problematic, because it is governed by the window-based flow control mechanisms of TCP/IP. Accordingly, if reception buffer 125 is reaching capacity, the flow control mechanisms of TCP/IP will prevent network 105 from sending additional packets that will be dropped by gateway 115. Similarly, network 110 uses the buffer-to-buffer credit-based flow control mechanisms of the FC protocol to control the flow of packets sent from network 110 to gateway 115.

However, the situation is complicated because packets need to traverse gateway 115, e.g., packets transmitted from network 105 to network 110. After a packet is received by reception buffer 125, an ACK is sent from gateway 115 to network 105. Gateway 115 processes the packet and attempts to enqueue the packet in transmission buffer 130 for packets awaiting transmission to network 110.

A problem can arise, for example, if network 105 is producing packets faster than they can be consumed by network 110, due perhaps to congestion in network 110. In such a scenario, reception buffer 125 is receiving packets and gateway 115 is sending ACKs to network 105 and forwarding the packets to transmission buffer 130. However, if transmission buffer 130 is sending the packets at a slower rate than it is receiving the packets, transmission buffer 130 may be required to drop some of the packets intended for network 110. Reception buffer 125 receives no indication of this problem and continues to forward packets at a rate appropriate for the conditions of network 105 and link 112.

Therefore, it would be desirable to implement mechanisms to improve the flow control coordination within gateways between networks.

SUMMARY OF THE INVENTION

Method and devices are provided for implementing flow control coordination in a gateway between a first network (a TCP/IP network) and a second network. The second network may be any type of network, including another TCP/IP network. In some implementations, the throughput of the first network is controlled by modifying the round trip time ("RTT") observed by a TCP connection. In other implementations, the throughput of the first network is controlled by modifying the size of the TCP window.

Some embodiments of the invention provide a gateway between a first network and a second network. The first network may be based on any protocol capable of exercising a flow control function, including but not limited to the Fibre Channel protocol, the TCP/IP protocol and the IEEE 802.2 protocol. The second network is a TCP/IP network. The gateway is configured to determine a first flow condition of the first network and modulate a second flow condition of the second network responsive to the first flow condition.

The first flow condition may be congestion on the first network. The gateway may modulate the second flow condition by modifying a round trip time observed by a source when sending packets to the gateway on the second network. The gateway may modulates the second flow condition by modifying a window size of a TCP connection originated by a source on the second network, the window size being used to control a transmission of packets to the gateway. The gateway may determine the first flow condition of the first network by inspecting a transmission buffer for packets awaiting transmission on the first network.

The gateway may modify the round trip time by sending acknowledgments on the second network only when packets originating the acknowledgments are transferred to the transmission buffer. Alternatively, the gateway may modify the round trip time according to a delay function based in part upon buffer occupancy of the transmission buffer.

The gateway may modify the window size based in part upon buffer occupancy of the transmission buffer. Alternatively, the gateway may modify the window size by sending three or more acknowledgments for a packet received by the gateway on the second network.

Some implementations of the invention provide a method of coordinating flow control between networks. The method includes the following steps: determining a first flow condition of a first network in communication with a second network via a gateway, the second network comprising a TCP/IP network; and modulating a second flow condition of the second network responsive to the first flow condition. The first network may be based on any protocol capable of exercising a flow control function, including but not limited to the Fibre Channel protocol, the TCP/IP protocol and the IEEE 802.2 protocol.

The first flow condition may be congestion on the first network. The modulating step may include modifying a round trip time observed by a source when sending packets to the gateway on the second network. Alternatively, the modulating step may include modifying a window size of a connection originated by a source on the second network, the window size being used to control a transmission of packets to the gateway. The determining step may include inspecting a transmission buffer for packets awaiting transmission on the first network.

The modulating step may involve sending acknowledgments on the second network only when packets originating the acknowledgments are transferred to the transmission buffer. Alternatively, the modulating step may involve modifying the round trip time according to a delay function based in part upon buffer occupancy of the transmission buffer. The modulating step may involve modifying the window size based in part upon buffer occupancy of the transmission buffer. The modulating step may involve sending three or more acknowledgments for a packet received by the gateway on the second network.

Alternative embodiments of the invention provide a gateway for controlling traffic between a first network and a second network. The second network is a TCP/IP network. The gateway includes: a device for determining a first flow condition of the first network; and a device for modulating a second flow condition of the second network responsive to the first flow condition.

Other embodiments provide a computer program embodied in a machine-readable medium, the computer program controlling a gateway between a first network and a second network. The second network is a TCP/IP network. The computer program controls the gateway to perform the following steps: determine a first flow condition of the first network; and modulate a second flow condition of the second network responsive to the first flow condition.

Yet other embodiments of the invention provide a system for regulating traffic between computer networks. The system includes: at least one node of a first network, the first network comprising a TCP/IP network; and a gateway for controlling traffic between the first network and a second network. The gateway includes: an apparatus for determining a first flow condition of the second network; and an apparatus for modulating a second flow condition of the first network responsive to the first flow condition. The second network may be a Fibre Channel network. The first flow condition may be determined, at least in part, by the occupancy of a transmission buffer within the gateway.

BRIEF DESCRIPTION OF THE DRAWINGS

FIG. 6A is a graph that depicts two plots of RTT versus time.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

For example, in many of the networks illustrated and described below, only a one-way flow of packets has been described between two networks. However, one of skill in the art will appreciate that, in most instances, the flow will be bi-directional. Therefore, when a gateway is described with a reception buffer for receiving packets from a first network, there will also normally be a transmission buffer for packets awaiting transmission to the first network from another network.

According to preferred embodiments of the invention, certain aspects of the TCP protocol are exploited in order to provide the desired flow control between networks. Therefore, a brief description of the salient features of TCP is set forth in the following paragraphs. The TCP protocol is described in various publications known to those of skill in the art, including "TCP/IP Illustrated, Volume I: The Protocols", by W. Richard Stevens (Addison-Wesley, 1994), which is hereby incorporated by reference.

Figure 1:
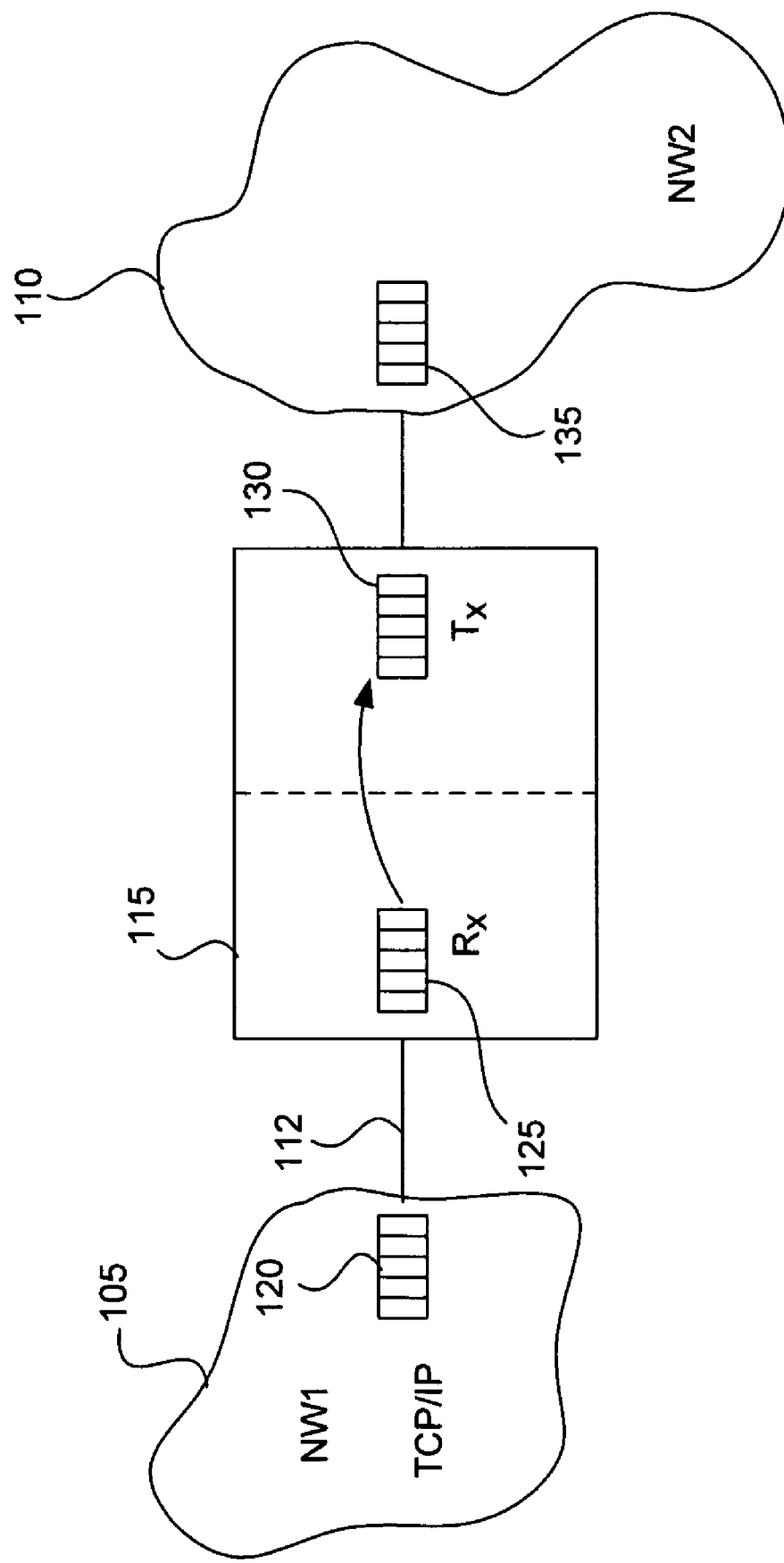
FIG. 1 is a diagram illustrating two networks and a gateway between the networks.
Figure 2A:
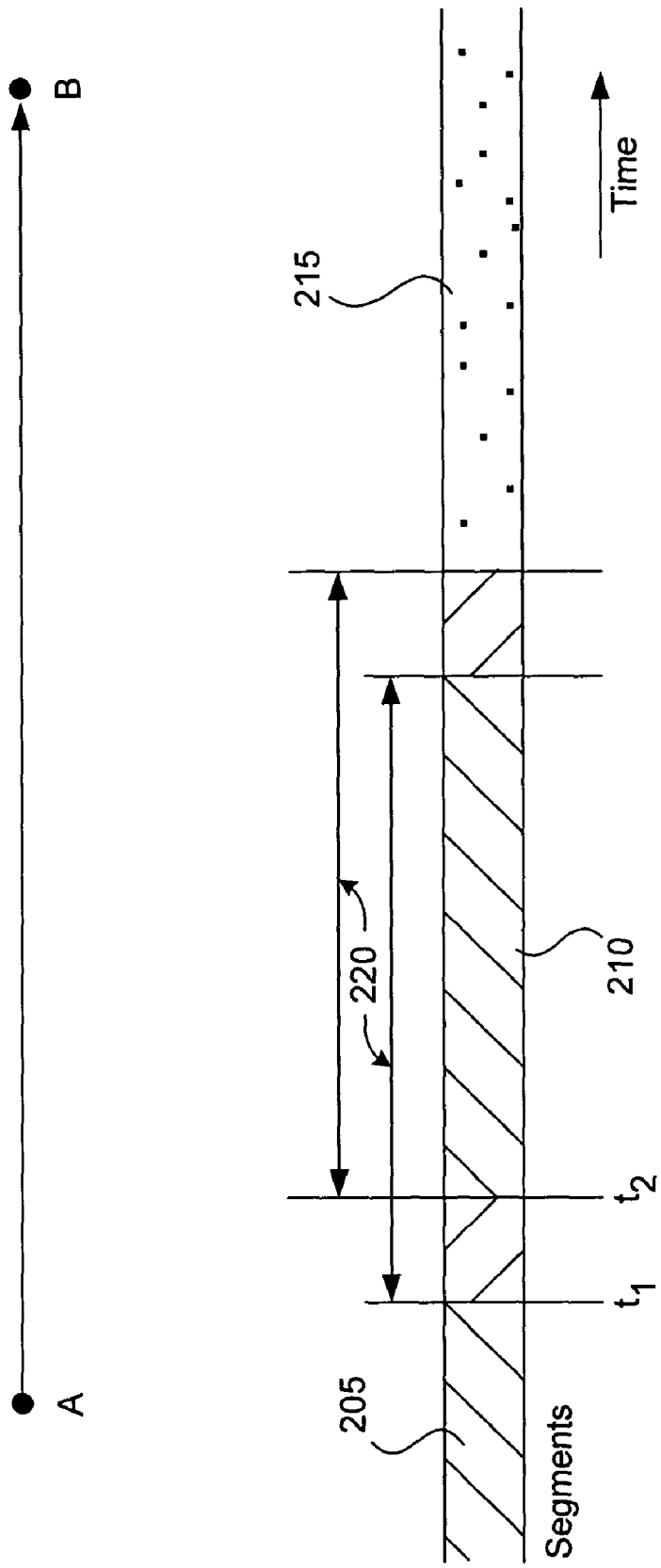
FIG. 2A illustrates the concept of a TCP sliding window.
Figure 2B:
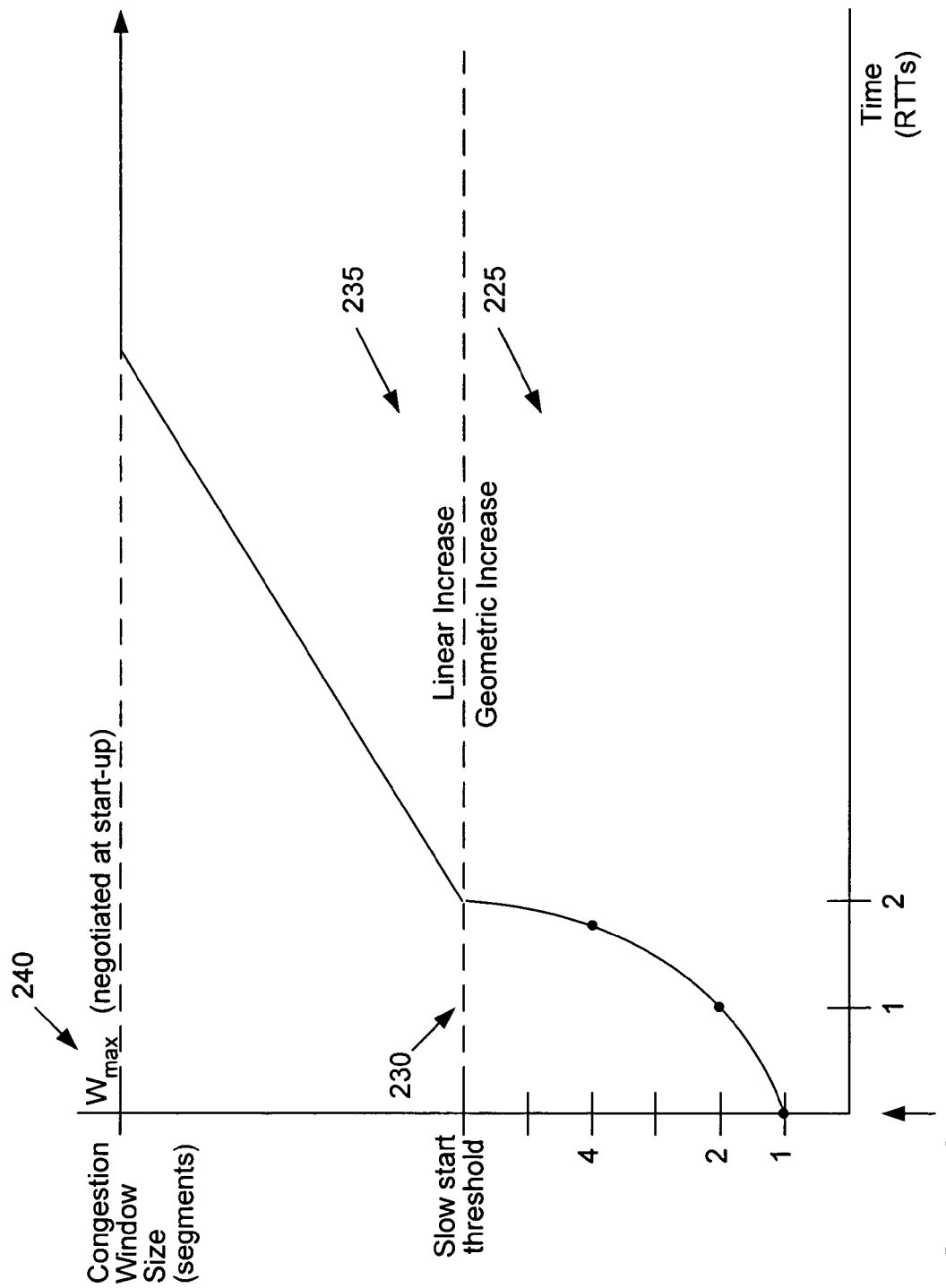
FIG. 2B is a graph that illustrates a TCP slow start threshold and a TCP maximum window.

TCP is a reliable transport protocol and it is byte stream oriented, meaning that it transfers a continuous stream of bytes between end points. Referring to FIG. 2A, packets are being sent from point A to point B. In this simple example, A is sending packets only to B and B is sending only acknowledgement ("ACK") packets to A. The TCP protocol bunches together a number of bytes into a segment, sends the segment to B, then waits for an ACK from B. Over an Ethernet network, the maximum size of a TCP segment is 1460 bytes of data, plus 40 bytes of overhead for IP, making a total of 1500 bytes, which is the maximum size of the payload of an Ethernet frame.

At any given time, there are segments 205 sent and acknowledged, segments 210 sent and not acknowledged, and segments 215 not yet sent. TCP window 220 represents the maximum number of bytes that transmitter A can have outstanding at any given time without having received an ACK from receiver B. TCP window 220 will encompass the segments sent and not acknowledged and possibly some segments not yet sent, but which soon will be sent. After an ACK is received for the segments, window 220 "slides," allowing A to send additional segments.

By reducing the size of window 220, the amount of data that can be outstanding is also reduced. Reducing the window size effectively reduces the rate of data transmission. This effect may easily be understood by considering two hypothetical cases.

In the first case, window 220 is so small that only one segment is outstanding at a time. Therefore, after transmitting one segment, A must wait until B has received the segment, B has sent an ACK and A has received the ACK before the window can slide, thereby allowing A to transmit the next segment. In other words, A must wait for an entire "round trip time" ("RTT") between transmission of sequential segments.

In the second hypothetical case, window 220 is large and A has a large number N of segments outstanding at one time. In this case, A does not need to wait until the entire round-trip time of each segment has elapsed before the window slides. Instead, A only needs to wait until the ACK for the first of the N segments is received before sliding the window.

The window size will be set according to information received by A regarding the space available in a buffer at point B for receiving the segments. TCP tries not to overflow B's reception buffer. At the beginning of the connection, B tells A how much buffer space is available. B continues to send "window advertisements" to A, which provide A with updates regarding the amount of space left in B's reception buffer.

TCP also has a "congestion window," which allows TCP to modulate its transmission rate according to a flow condition, e.g., congestion, on the network. A will use the smaller of the TCP transmission window and the congestion window as an "effective window" to determine flow rate.

The data flow can also be modulated on a TCP network by adjusting the "slow start threshold." When a TCP connection is established (or resumed after an interruption), the congestion window size will increase at an exponential rate from a minimum size (normally one segment) within region 225 until the congestion window size reaches slow start threshold 230. After the congestion window size surpasses slow start threshold 230, the congestion window size will increase in a linear fashion within region 235 until the congestion window size reaches a maximum effective window size 240, the magnitude of which is negotiated at start-up time.

Figure 3:
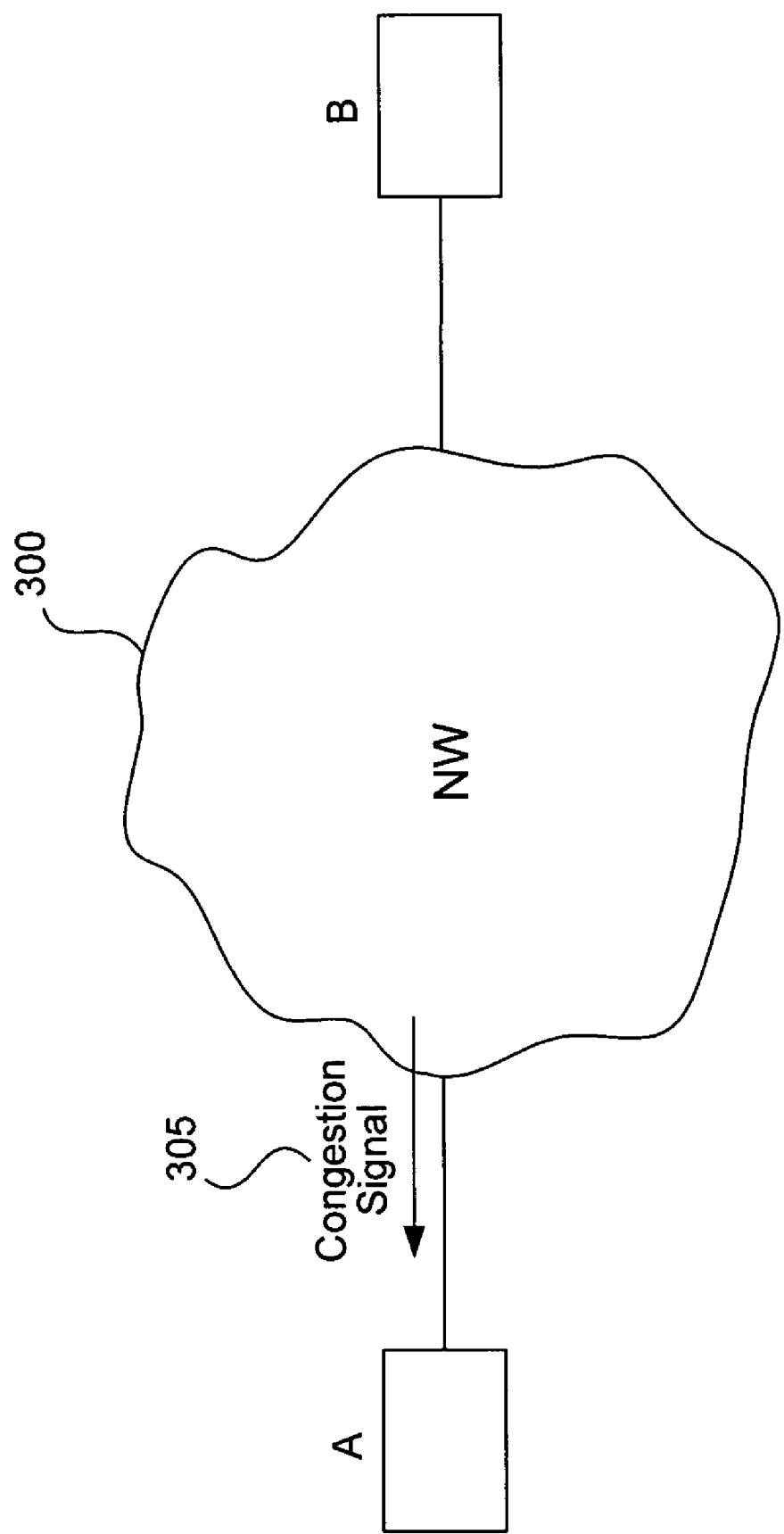
FIG. 3 illustrates the process of sending a congestion signal.

Referring to FIG. 3, network 300 is sending congestion signal 305 to A, indicating congestion on network 300. Congestion signal 305 may simply be generated by dropping packets, which A will interpret as network congestion. In response, A will shrink its congestion window (normally by cutting the congestion window in half), so that A will not send more data than network 300 can handle. Sometimes, congestion signal 305 is sent via a special marked packet.

The data flow of network 300 can also be adjusted by increasing the RTT, because this slows the rate at which the window slides. If the RTT is large, the window is "stuck" in one position for a longer time and will send no more data.

Considering the foregoing discussion, it may be appreciated that the basic formula for controlling the flow on a TCP/IP network is $$R = \text{Window\_size}/RTT \quad \text{(Equation 1),}$$

where

R is the flow rate;
Window_size is the size of the steady state mean of the effective window; and
RTT is the steady state mean of round trip time observed by a transmitter (e.g., A).

This relationship provides the basis for allowing a gateway to match the flow of a TCP/IP network according to flow conditions of a second network. The second network could be any type of network including another TCP/IP network. Accordingly, some methods of the invention modulate the RTT in order to regulate the flow on the TCP/IP network. Alternative methods of the invention modulate the size of the effective window of TCP connections on the TCP/IP network. Some methods combine both approaches.

One such method will now be described with reference to FIGS. 4 and 5. Segments from TCP/IP network 405 are sent to reception buffer 410, processed (if necessary) by gateway logic 412, then moved to transmission buffer 420 to await transmission to network 425. Gateway logic 412 may be implemented by software, hardware (e.g., an integrated circuit) or any combination of the two. The processing may include encapsulation, decapsulation, assembly of TCP segments into frames used by network 425 (e.g., FC frames if network 425 uses the FC protocol), detection of patterns in the TCP segments (e.g., if gateway 415 provides intrusion detection functionality), or other appropriate processing.

In this example, there is intermittent congestion on network 425, but no congestion on network 405. Accordingly, the flow of packets from network 405 needs to be modulated in order to match the flow from transmission buffer 420 to network 425.

In this implementation, gateway logic 412 inspects transmission buffer 420 to determine a flow condition of network 425. Gateway logic 412 causes packets to be moved from reception buffer 410 to transmission buffer 420 only if there is space in transmission buffer 420. If transmission buffer 420 is full, packets are retained in reception buffer 410 and no ACK is generated for these packets. This delay effectively increases the RTT and decreases the flow rate between network 405 and gateway 415.

Gateway logic 455 works in a parallel fashion. Suppose network 425 is an FC network. FC frames are received by reception buffer 450, but gateway logic 455 does not process the frames and send the processed frames to transmission buffer 460 for packets awaiting transmission to network 405. The buffer-to-buffer flow control of the FC protocol prevents more frames from being sent to reception buffer 450 until gateway logic 455 moves a frame from reception buffer 450 and frees a buffer space. Gateway 415 would implement a similar process for other types of network 425.

Figure 4:
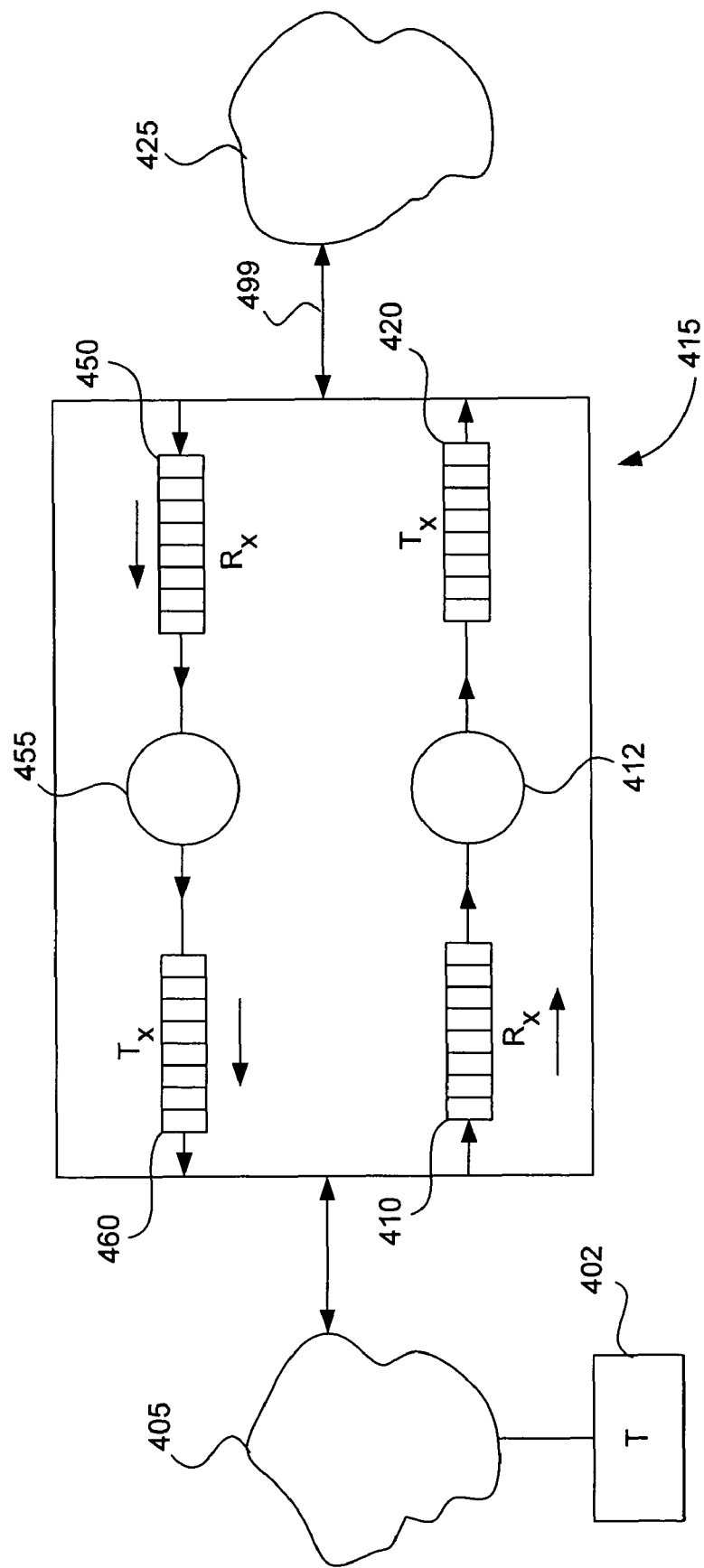
FIG. 4 is a block diagram that illustrates an exemplary gateway between a TCP network and another network.
Figure 5:
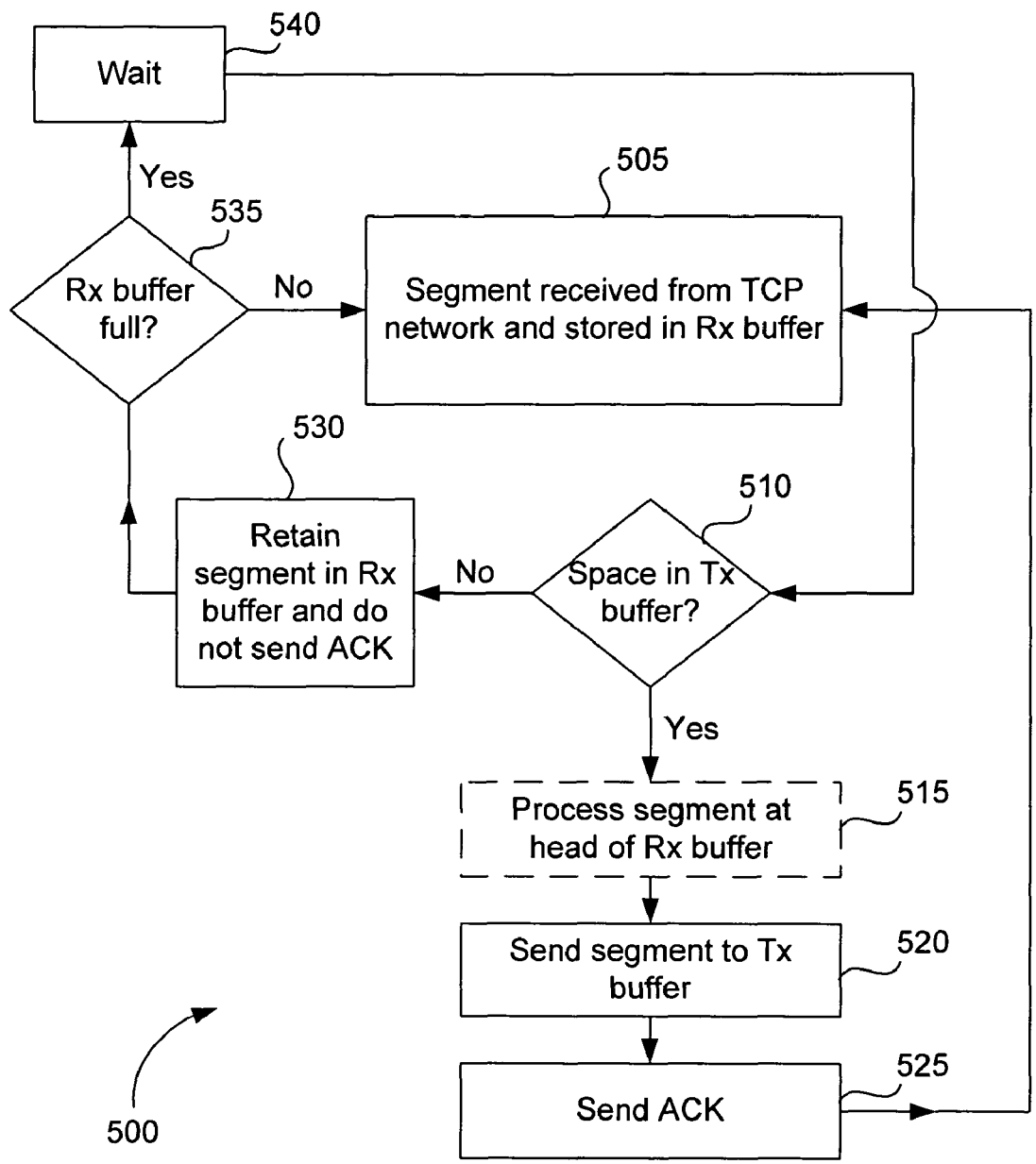
FIG. 5 is a flow chart that depicts a flow control method of the present invention.

FIG. 5 illustrates method 500 according to some implementations of the present invention. The steps of method 500 may vary and do not all need to be performed in the order indicated in FIG. 5. In step 505, segments are received from a TCP network (such as network 405 of FIG. 4) and stored in a reception buffer (such as reception buffer 410). In step 510, it is determined (e.g., by gateway logic 412) whether there is space in a transmission buffer (such as transmission buffer 420). If there is space, the segment at the head of the reception buffer is processed, if necessary, in optional step 515. If method 500 is implemented between two TCP/IP networks, it is possible that no processing will be required.

The segment is then sent to the transmission buffer (step 520) and an ACK is sent to the node on the TCP/IP network that transmitted the segment (step 525). In alternative embodiments, the ACK is sent before step 520 or before step 515.

If it is determined in step 510 that there is no space in the transmission buffer, the segment will be retained in the reception buffer and no ACK will be sent yet (step 530). If the reception buffer is not full, segments can still be received from the TCP/IP network and stored in the reception buffer. If the reception buffer is full, after a time delay (step 540) it will once again be determined whether there is space in a transmission buffer.

Method 500 is effective, but involves a relatively abrupt change in RTT. An alternative method may be preferable if, for example, there is severe network congestion on network 425. In such circumstances, buffer 410 will remain full for a long time. Network 405 will continue to send copies of the last segment because packets are stuck in buffer 410 and no ACK packets are sent back. This is not an effective use of system resources.

Figure 6B:
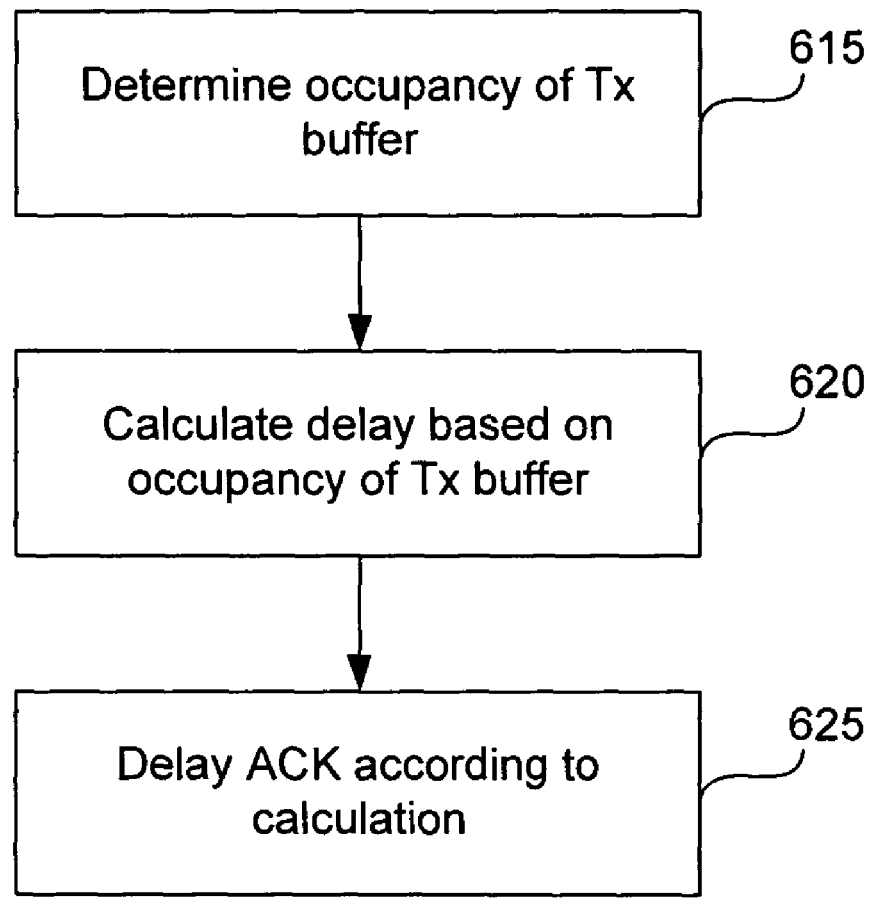
FIG. 6B is a flow chart that outlines a method of gradually altering an RTT according to the present invention.

Method 650, shown in FIG. 6B, is a refinement of the first method that includes a more sophisticated technique for determining flow conditions of network 425. Method 650 allows a more gradual change in the RTT in response to changing flow conditions of network 425.

FIG. 6A is a graph that illustrates the difference between method 500 and method 650 according to some implementations of the invention, the latter of which will be described below with reference to FIGS. 6B and 6C. Step function 605 illustrates method 500. At time $t_1$, gateway logic determines that transmission buffer 420 is full, at which time reception buffer 410 abruptly stops sending ACK packets. Therefore, at time $t_1$ RTT makes an abrupt increase in response to this detected flow condition.

In contrast, method 650 provides a more gradual change in RTT in response to changing flow conditions of network 425, as indicated by curve 610. Various implementations of method 650 will cause different slopes for curve 610. For example, some implementations of method 650 will produce a linear function, others will produce a exponential function, etc. Preferably, curve 610 is monotonically increasing.

FIG. 6B is a flow chart that outlines method 650 in general terms. According to some implementations, these steps are performed by gateway logic 412. In step 615, the occupancy or "fullness" of a transmission buffer for transmitting packets received from a TCP/IP network is determined. In step 620, an ACK delay is calculated, based at least in part on the occupancy determination. In step 626, the next ACK sent by the gateway is delayed according to the calculation. By periodically determining the occupancy of the transmission buffer and applying a variable ACK delay, more gradual changes in RTT may be implemented than are possible using method 500 alone.

A more detailed implementation of method 650 will now be described with reference to FIGS. 4 and 6C. According to this method, the following exponentially weighted moving average ("EWMA") formula is used to calculate an "average buffer size":

$$\text{avg\_buf}[n] = (\_\text{beta}\_*\text{current\_buf\_size}[n]) + ((1 - \_\text{beta}\_) * \text{avg\_buf}[n-1]) \quad \text{(Equation 2),}$$

where:
  avg_buf[n] is the average transmission buffer occupancy at the $n^{th}$ time interval;
  current_buf_size[n] is the transmission buffer occupancy at the $n^{th}$ time interval; and
  _beta_ is a weighting parameter such that $0 \leq \_\text{beta}\_ \leq 1$.

The transmission buffer could be, for example, transmission buffer 420 of FIG. 4. Preferably, the length of each ($n^{th}$) time interval is fixed and either equal to, or slightly longer than, the time required to transmit a maximum sized packet on network 425.

Figure 6C:
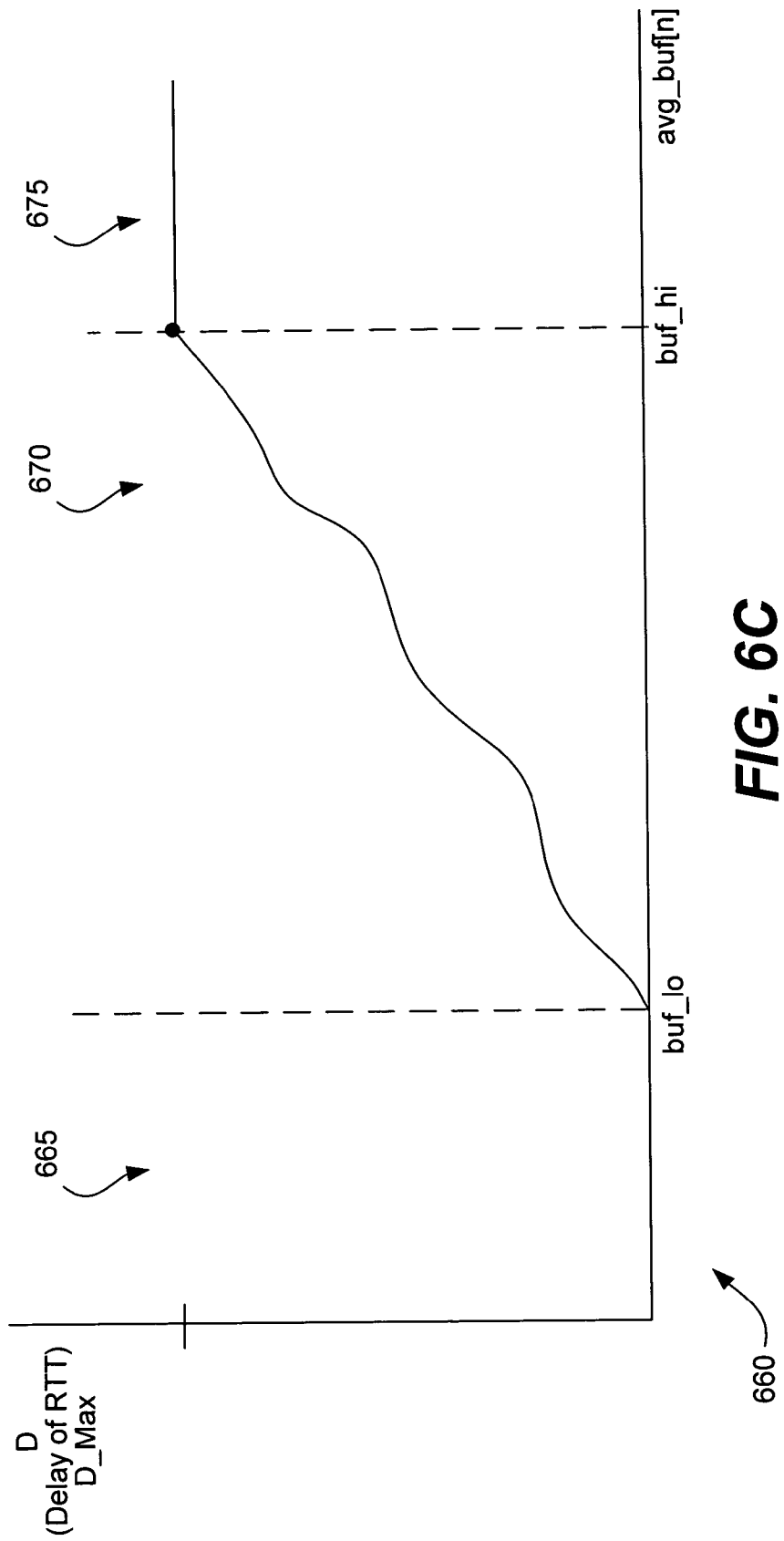
FIG. 6C is a graph that depicts a method of gradually altering an RTT according to the present invention.

FIG. 6C is a plot of a generalized delay function 660 to be applied to ACK packets according to some implementations of the invention. As noted in FIG. 6C, buf_lo and buf_hi are two values of avg_buf[n] that delimit threshold region 670. According to some implementations, when avg_buf[n] has a value in threshold region 670, an ACK is delayed by an amount D that is computed according to a delay function:

$$D = d(\text{avg\_buf}[n]) \quad \text{(Equation 3)}$$

The delay function is preferably monotonically increasing in threshold region 670, zero in region 665 and a maximum value ("D_Max") in region 675. In some implementations, the delay function increases linearly in threshold region 670.

D_Max is the maximum delay that an ACK will experience. According to some implementations, the value of D_Max can be determined as follows:

$$D\_\text{Max} = (M*8)/(R*c\_\text{max}) \quad \text{(Equation 4)}$$

where
  R is a rate of a link between a transmission buffer and a network (e.g., link 499 between transmission buffer 420 and network 425);
  c_max is a maximum tolerable value of a congestion factor c that modulates R to provide an effective transmission rate $R_e = R*c$, depending on the congestion on the network; and
  M is the average size of the packets transmitted on the network.

Congestion factor c can range from 0 to 1. When the network is not congested, c=1 and $R_e = R$. When the network is congested, c is between 0 and 1 and $R_e < R$.

When the transmission buffer is full due to congestion, M bytes can be transferred from the reception buffer (e.g., reception buffer 410) when a packet leaves the transmission buffer. This happens every $(M*8)/R_e = (M*8)/(R*c\_\text{max})$ seconds.

In preferred implementations, TCP segments are held indefinitely in the reception buffer when the transmission buffer is full and the corresponding ACK is withheld. In other words, method 650 preferably defaults to method 500 when the transmission buffer is full.

Other implementations of the invention modulate the TCP window size in order to control the flow rate on the TCP/IP network. Although the window size could be modified abruptly, the window size is preferably changed gradually. In some such embodiments, gateway 415 sends an explicit signal to a transmitting node (e.g., transmitting node 402 of FIG. 4) that the window size should be reduced.

Figure 7A:
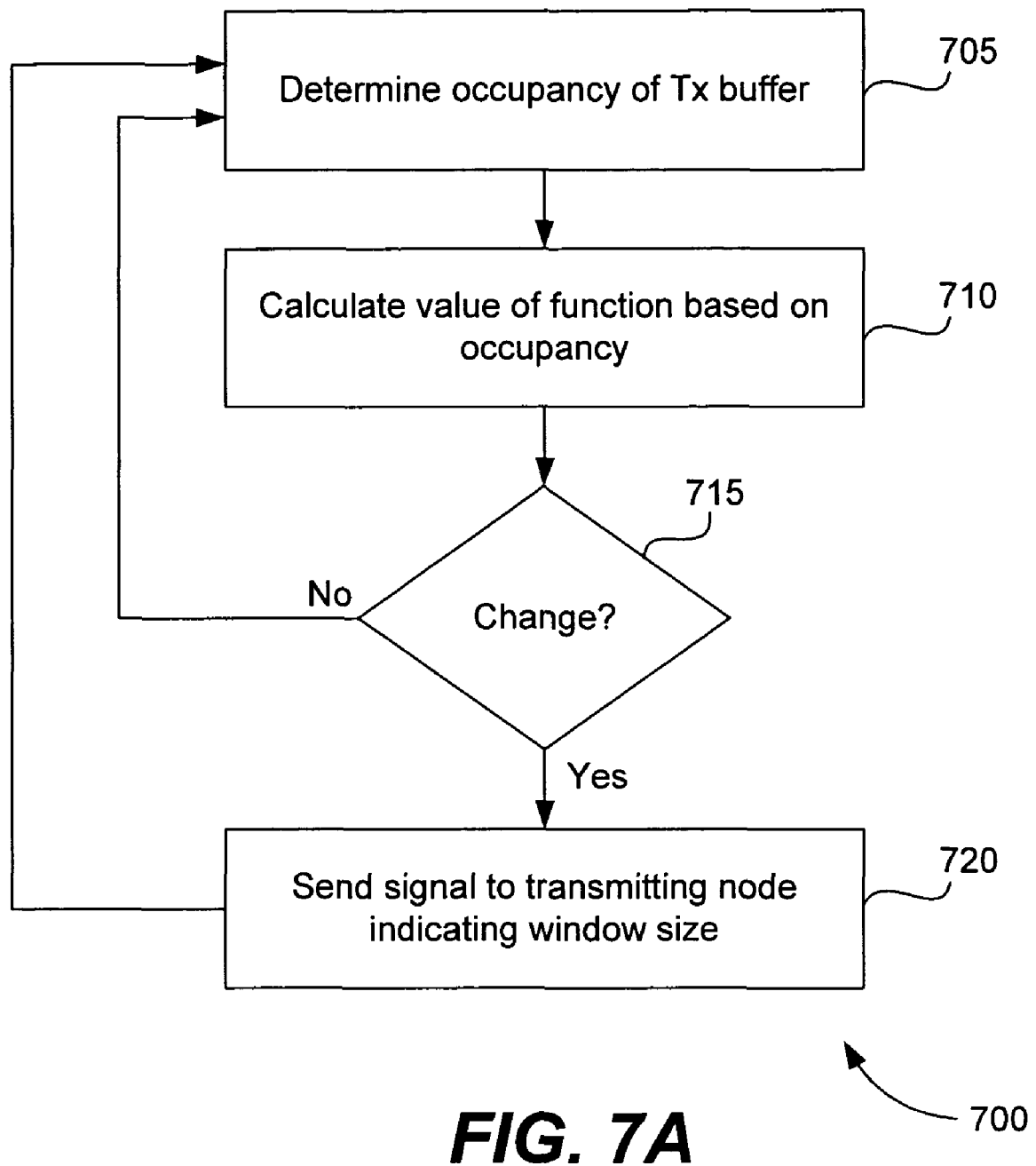
FIG. 7A is a flow chart that outlines a method of altering a window size according to the present invention.

FIG. 7A is a flow chart that outlines the steps of method 700 according to some such implementations. In step 705, the occupancy of a transmission buffer is determined. Based on the determined occupancy, the value of a window function is calculated in step 710. In optional step 715, it is determined whether the window function value has changed. If so, a signal is sent to a transmitting node on the TCP/IP network indicating a new window size. If not, the method returns to step 705.

Figure 7B:
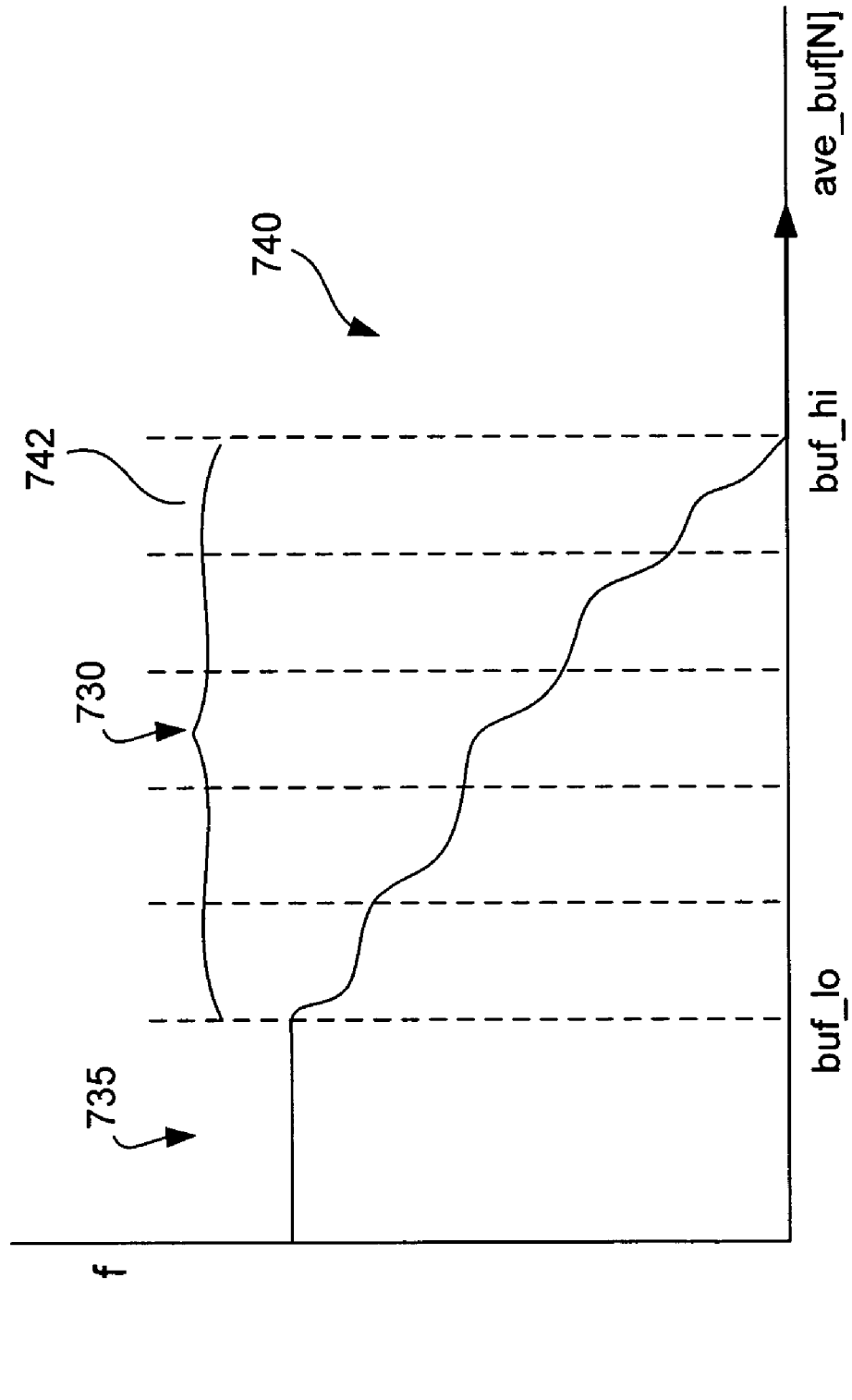
FIG. 7B is a graph that depicts a method of altering a window size according to the present invention.

The details of one such implementation will now be described with reference to FIGS. 4, 7B and 7C. In this implementation, Equation 2 is used to determine ave_buf[n]. As above, buf_lo and buf_hi are two values of ave_buf[n] that delineate a threshold region 730 (see FIG. 7B). When ave_buf[n] is determined to be in threshold region 730, a signal is sent to the source of TCP traffic 402, indicating that its window parameters should be as follows:

$$w = f(\text{ave\_buf}[n]) * \text{current\_}w \quad \text{(Equation 5);}$$

$$w\_\text{thresh} = f(\text{ave\_buf}[n]) * \text{current\_}w\_\text{thresh} \quad \text{(Equation 6); and}$$

$$w\_\text{max} = f(\text{ave}_{13}\text{buf}[n]) * \text{original\_}w\_\text{max} \quad \text{(Equation 7),}$$

where:
  w is the new TCP window size;
  w_thresh is the TCP "slow start threshold";
  w_max is the maximum TCP window size;
  original w_max is the maximum TCP window size that was negotiated when the TCP session was initiated; and
  f(avg_buf[n]) is a window size function, also referred to herein as a feedback function, that equals 1 in region 735, decreases monotonically in region 730 as avg_buf[n] increases, and is close to 0 in region 740. For example, f(avg_buf[n]) is a monotonically decreasing linear function in some implementations.

In one such implementation, the function is governed by the following equation when avg_buf[n] is in region 730:

$$f(\text{avg\_buf}[n]) = (\text{buf\_hi} - \text{avg\_buf}[n])/(\text{buf\_hi} - \text{buf\_lo}) \quad \text{(Equation 8)}$$

When avg_buf[n] is in region 735, no action is taken. When avg_buf[n] is in region 740, a signal is sent indicating that the window should be set to a minimum size.

Region 730 may be further divided into any number of subregions 742. The subregions preferably span equal ranges of avg_buf[n]. According to some embodiments, when avg_buf[n] is within a subregion, only a single window-size signal will be sent. In some such embodiments, f(avg_buf[n]) has a single, predetermined value within each subregion. In other embodiments, f(avg_buf[n]) will be calculated only once while avg_buf[n] remains within a subregion.

If there are multiple TCP sessions originating from multiple sources, each session is notified to modulate its max_window_size by the same factor f(avg_buf[n]). However, this notification should preferably be done only once while avg_buf[n] remains within a particular subregion.

Preferably, when the transmission buffer is full, method 700 defaults to method 500.

Figure 8:
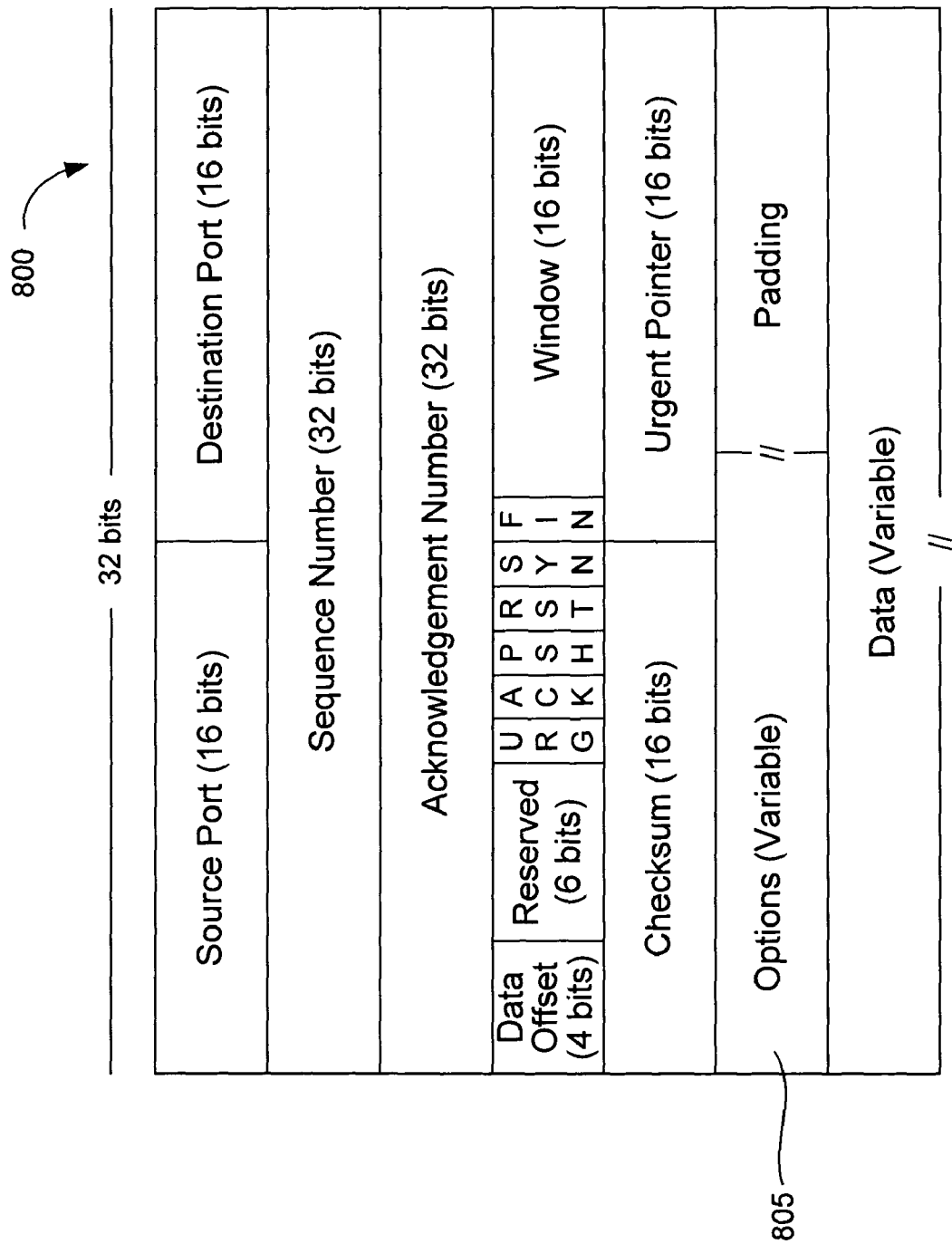
FIG. 8 illustrates an exemplary position for encoding a signal in a TCP segment.

The window size signal may be transmitted in any appropriate manner. In some implementations, one of the options fields 805 of TCP segment 800 (see FIG. 8) is encoded with a window size signal.

Method 900 involves simulating congestion by transmitting spurious ACKs in order to modulate the window size of a TCP source in a TCP/IP network. In fact, the TCP protocol has embedded mechanisms for reacting to congestion by decreasing its transmission rate. If there is a gap in the segments received, i.e., a packet has been dropped by the network presumably due to congestion, the receiving node will keep sending an ACK for the last segment received in order. When a transmitting node receives at least 3 duplicate ACKs for the same segment, it assumes that the segment transmitted after the one for which the duplicate ACKs were received was lost due to congestion. The transmitting node performs a so-called "fast retransmit," followed by a "fast recovery," which involves re-transmitting the segment(s) assumed to be lost, cutting the congestion window and the slow start threshold in half and resuming the transmission from the point it was interrupted by the detection of the duplicate ACKs.

For example, suppose that a transmitting node had transmitted segments 1 through 15. Suppose that a receiving node received segments 1 through 9 and 11 through 15, but not segment 10. The receiving node would send an ACK for segments 1 through 8 and 5 ACKs for segment 9 (one is actually the acknowledgement for segment 9, while the other 4 are being sent in response to segment 11 through 15). The transmitting node would assume that segment 9 was the last segment received in order. Accordingly, it would reduce both the congestion window and the slow start threshold by 50%, re-transmit segment 10, and resume transmission from segment 16, if allowed by the current window. On reception of segment 10, the receiving node will generate a cumulative acknowledgment from segment 10, possibly including some of the segments sent by the transmitting node after segment 15. It is important to note that after the fast retransmit is performed, the transmitting node has reduced its rate because the congestion window has been cut in half.

Therefore, preferred embodiments of method 900 exploits this feature of the existing TCP protocol by sending 3 ACKs for a recently-received segment to decrease a window size of a transmitting node. The 3 ACKs are sent even when no segments have been received out of order.

Figure 9A:
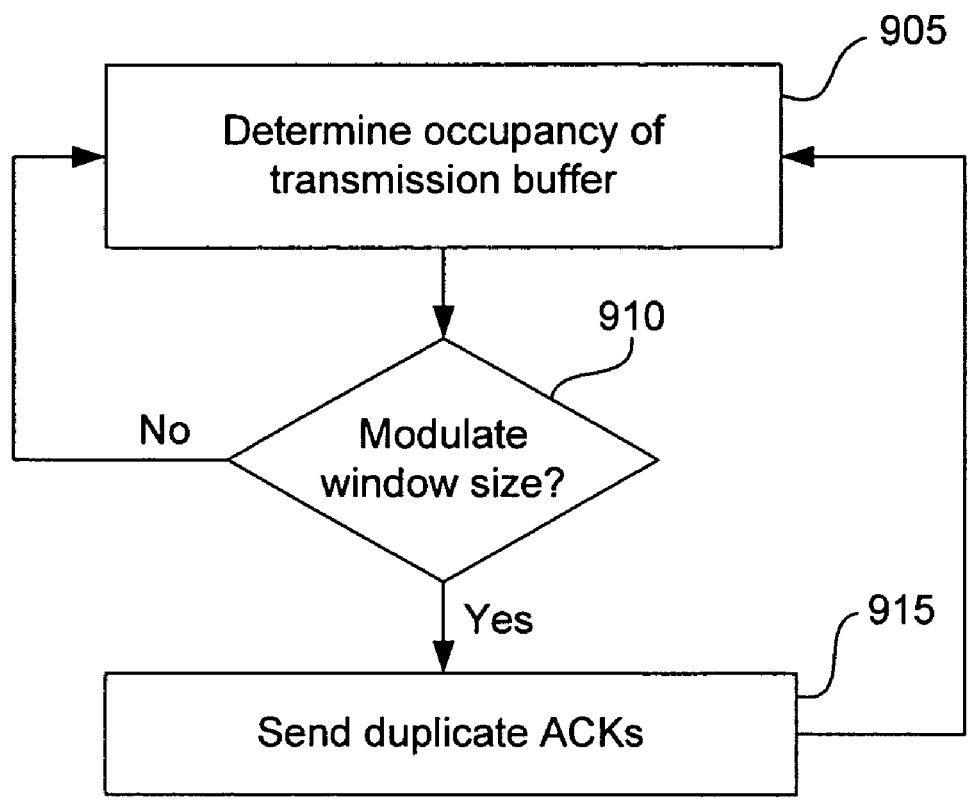
FIG. 9A is a flow chart that outlines a method of altering a window size according to the present invention.

FIG. 9A is a flow chart that depicts method 900 according to some such implementations of the invention. In step 905, the occupancy of a transmission buffer (e.g., transmission buffer 420 of FIG. 4) is determined. As in the previously-described methods, the transmission buffer occupancy is used as a measure of the level of congestion on a network across which the packets in the transmission buffer will be transmitted (e.g., network 425).

In step 910, a decision is made whether to modulate a window size of a transmitting node on a TCP/IP network (e.g., node 402), based on the transmission buffer occupancy. If it is determined that the window size should be decreased, in step 915 duplicate ACKs (preferably 3 or more ACKs) are sent to the transmitting node. The duplicate ACKs are generated for the last segment received at the moment the decision of decreasing the windows was made and are sent back-to-back, without interleaving them with ACKs for subsequent segments. If the window size does not need to be decreased, the process returns to step 905.

Figure 9B:
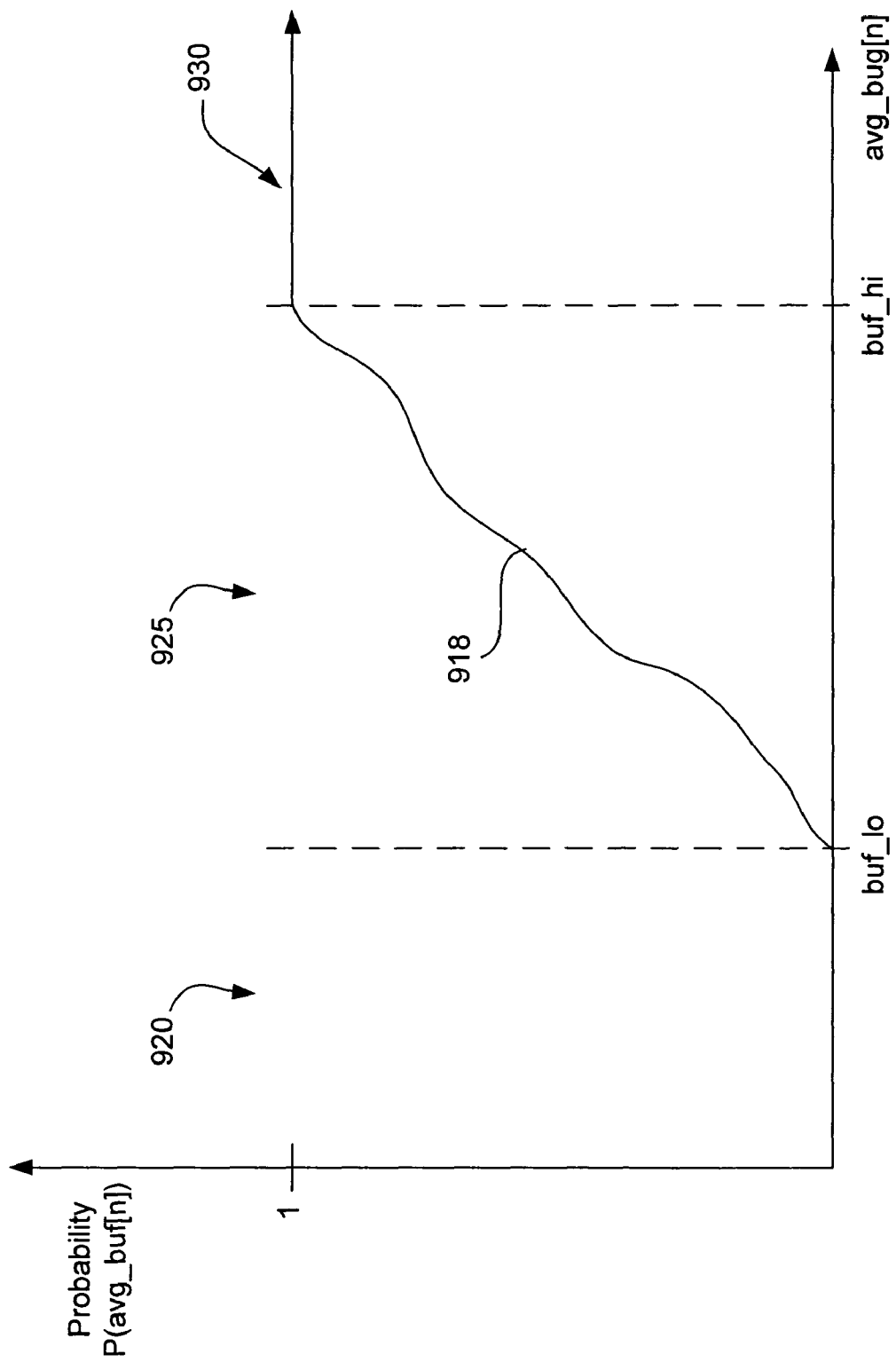
FIG. 9B is a graph that depicts a method of altering a window size according to the present invention.

A more detailed implementation of method 900 will now be described with reference to FIG. 9B. According to this implementation, duplicate ACKs are generated according to probability curve 918. In region 920, when avg_buf[n] is below buf_lo, there is a minimum probability of sending duplicate ACKs. In this example, P(avg_buf[n]) equals 0 in region 920, indicating that there is a zero probability that duplicate ACKs will be generated. In region 925, when avg_buf[n] is between buf_lo and buf_hi, P(avg_buf[n]) increases monotonically to a maximum value (e.g., 1). In some such implementations, P(avg_buf[n]) increases linearly between buf_lo and buf_hi. In region 930, when avg_buf[n] is above buf_hi, P(avg_buf[n]) remains at the maximum value.

Preferably, as with the preceding methods, when the transmission buffer is full method 900 provides the same result as method 500.

Figure 10:
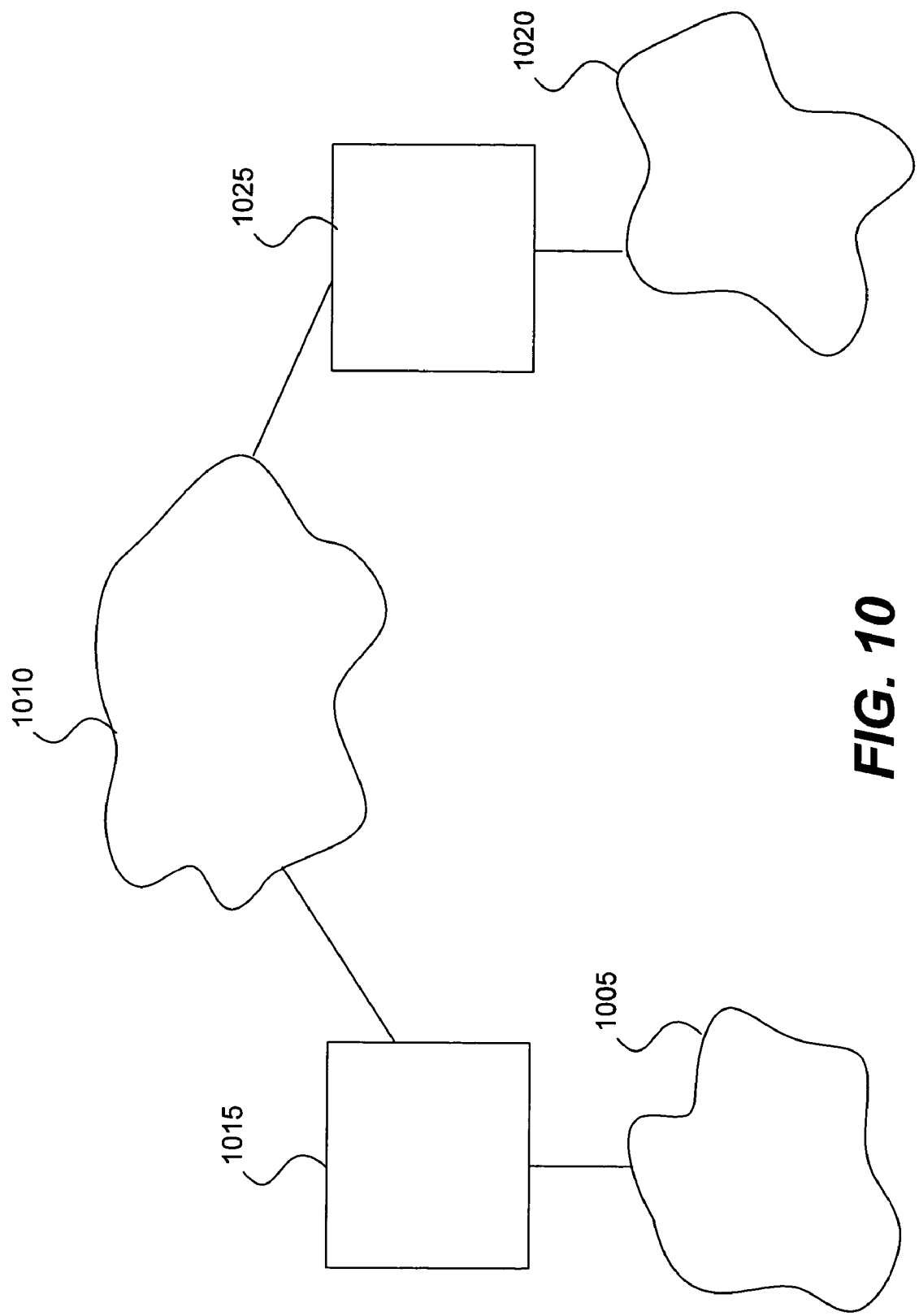
FIG. 10 is a diagram illustrating networks connected by an intermediate TCP/IP network.

Various exemplary applications and contexts for the present invention will now be described with reference to FIG. 10. Network 1005 and network 1010 are connected by gateway 1015. Similarly, networks 1010 and 1020 are connected by gateway 1025. Preferably, both of gateways 1015 and 1025 and are configured to implement one or more of the previously-described methods of the invention.

According to some implementations of the invention, network 1010 is a TCP/IP network, such as the Internet. At least one of networks 1005 and 1020 may be an FC network, e.g. a storage area network ("SAN"). For example, network 1005 may be a SAN located in Berkeley, Calif. and network 1020 may be a SAN located in Boston, Mass., with network 1010 providing the long-distance transport of FC frames encapsulated and decapsulated by gateways 1015 and 1025. Examples of some such gateways are described in U.S. patent application Ser. Nos. 10/351,167 and 10/350,574 both of which were filed on Jan. 23, 2003 and both of which are hereby incorporated by reference for all purposes.

At least one of gateways 1015 and 1025 can also be disposed between two TCP/IP networks. For example, gateway 1015 could be an intrusion detection device between corporate network 1005 and Internet 1010. According to such embodiments, gateway 1015 acts as a smart firewall and could, for example, examine each packet and detect certain patterns which would cause the packet to be transmitted or dropped.

Alternatively, at least one of gateways 1015 and 1025 can also be disposed between a TCP/IP network (e.g., network 1010) and a supercomputer network (e.g., network 1020). The supercomputer network may operate, e.g., according to IEEE 802.2 LLC protocol, which is a fast, simple and reliable protocol suitable for clusters of very fast computers.

Figure 11:
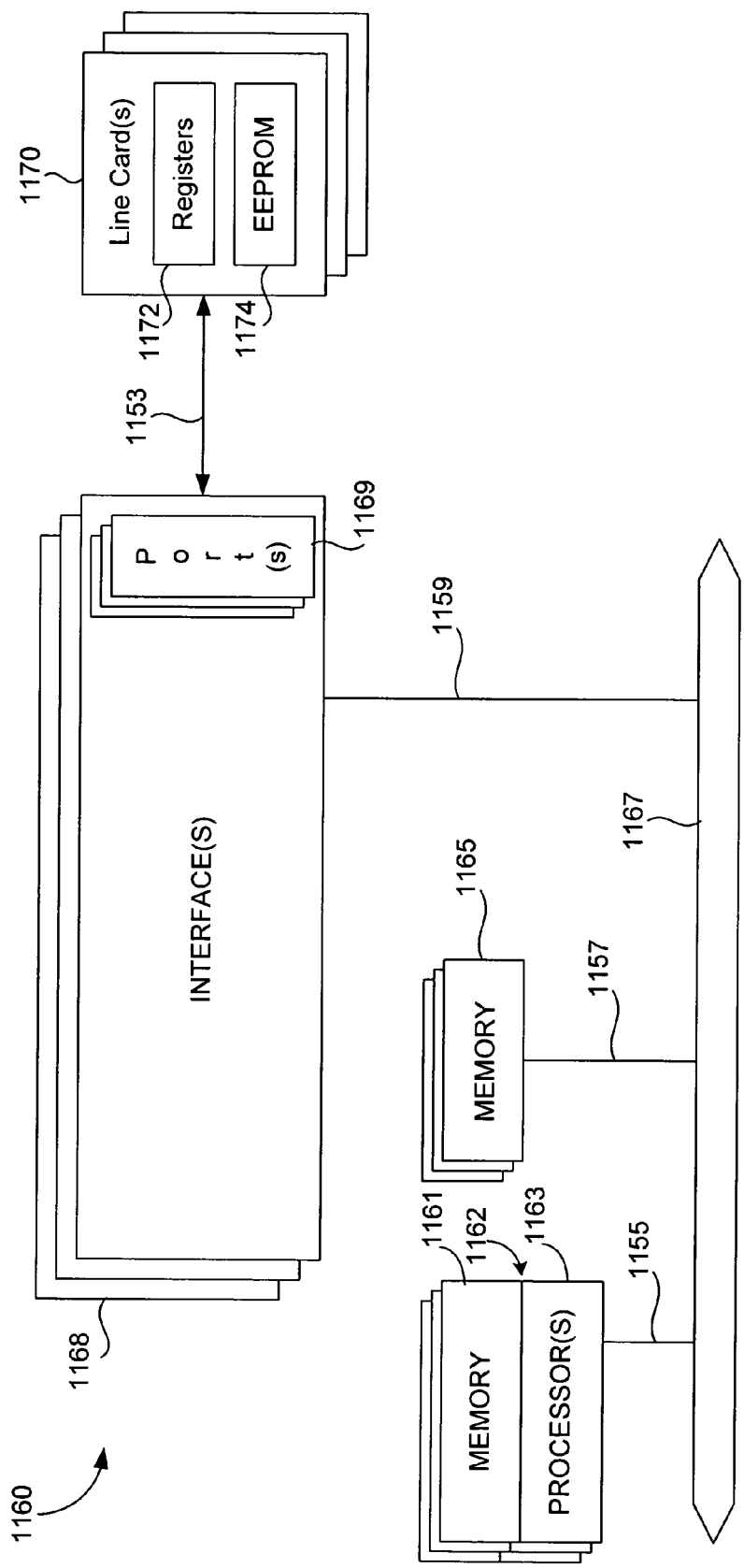
FIG. 11 is a block diagram of a network device that may be configured to implement aspects of the present invention.

Referring now to FIG. 11, an exemplary network device 1160 will be described that is suitable for implementing the functions of gateways 415, 1015 and/or 1025 according to some implementations of the present invention. Network device 1160 includes a master central processing unit (CPU) 1162, interfaces 1168, and a bus 1167 (e.g., a PCI bus).

Generally, interfaces 1168 include ports 1169 appropriate for communication with the appropriate media. In some embodiments, one or more of interfaces 1168 includes at least one independent processor 1174 and, in some instances, volatile RAM. Independent processors 1174 may be, for example ASICs or any other appropriate processors. According to some such embodiments, these independent processors 1174 perform at least some of the functions of the gateway logic described herein such as flow control, the encapsulation of frames from an FC network as TCP/IP packets, etc. In some embodiments, one or more of interfaces 1168 control such communications-intensive tasks as media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "line cards"). Generally, interfaces 1168 control the sending and receiving of data packets over the network and sometimes support other peripherals used with the network device 1160. Among the interfaces that may be provided are FC interfaces, Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. For example, when network device 1160 is configured as an intermediate router, the CPU 1162 may be responsible for analyzing FC packets, encapsulating the packets, and forwarding packets for transmission to an IP cloud. According to some embodiments, CPU 1162 accomplishes all these functions under the control of software including an operating system (e.g. Windows NT), and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Although the system shown in FIG. 11 illustrates one specific network device of the present invention, it is by no means the only network device architecture on which the present invention can be implemented. For example, if a gateway according to the present invention is implemented in an intrusion detection device, a stand-alone system may be used instead of implementing gateway functions in a line card. Moreover, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, this invention may be implemented in specially configured routers or servers, as well as Cisco Aironet 350 Series Access Points, available from Cisco Systems, Inc. of San Jose, Calif. A general architecture for some of these machines will appear from the description given above. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A gateway between a first network and a second network, the second network comprising a TCP/IP network, the gateway comprising:
    a transmission buffer for first data awaiting transmission on the first network; and
    a reception buffer that receives second data from the second network, the gateway being configured to determine a first flow condition of the first network by inspecting the transmission buffer for packets awaiting transmission on the first network and modulate a second flow condition of the second network responsive to the first flow condition by controlling data transfers between the reception buffer and the transmission buffer, wherein data transfers between the reception buffer and the transmission buffer are controlled by generating by the gateway and sending by the gateway one or more acknowledgments to a source on the second network for a data packet that has previously been received by the gateway from the source on the second network, wherein the data packet is addressed to a receiver on the first network, wherein the gateway is a device that is separate from the receiver on the first network, wherein the first flow condition comprises congestion on the first network;

wherein acknowledgments are generated and transmitted to the source on the second network in response to transferring to the transmission buffer packets originating the generation and sending of acknowledgments by the gateway.

2. The gateway of claim 1, wherein the gateway modulates the second flow condition by modifying a round trip time observed by the source in the second network when sending packets to the gateway.

3. The gateway of claim 2, wherein the gateway modifies the round trip time by sending acknowledgments to the source on the second network only when packets originating the generation and sending of acknowledgments by the gateway are transferred to the transmission buffer.

4. The gateway of claim 2, wherein an acknowledgement (ACK) delay is calculated based at least in part upon buffer occupancy of the transmission buffer, wherein the gateway modifies the round trip time by delaying the sending of at least one of the acknowledgements to the source on the second network according to the calculated ACK delay.

5. The gateway of claim 1, wherein the gateway modulates the second flow condition by modifying a window size of the TCP connection originated by the source on the second network, the window size being used to control a transmission of packets to the gateway.

6. The gateway of claim 5, wherein the gateway modifies the window size based in part upon buffer occupancy of the transmission buffer, wherein the gateway modifies the window size by sending a signal to the source on the second network, wherein the signal indicates that the window size should be reduced.

7. The gateway as recited in claim 6, wherein the signal indicates a desired set of window parameters.

8. The gateway of claim 5, wherein the gateway modifies the window size by generating and sending three or more acknowledgments for the data packet that has previously been received by the gateway from the source on the second network.

9. The gateway of claim 1, wherein the first network is based on a protocol selected from the group consisting of a Fibre Channel protocol, a TCP/IP protocol and an IEEE 802.2 protocol.

10. The gateway as recited in claim 1, wherein the gateway is further configured to modulate the second flow condition of the second network responsive to the first flow condition by modifying a time at which an acknowledgement of a data packet transmitted by a source on the second network is generated by the gateway.

11. The gateway of claim 1, wherein first network is not a TCP/IP network.

12. The gateway of claim 1, wherein the gateway generates and sends the one or more acknowledgements independent of acknowledgements received by the gateway.

13. A method of coordinating flow control between networks, the method comprising:

determining by a gateway a first flow condition of a first network in communication with a second network via the gateway, the second network comprising a TCP/IP network, the gateway having a transmission buffer for first data awaiting transmission on the first network;

and a reception buffer that receives second data from the second network, wherein the gateway determines the first flow condition of the first network by inspecting the transmission buffer for packets awaiting transmission on the first network; and modulating by the gateway a second flow condition of the second network responsive to the first flow condition by controlling data transfers between the reception buffer and the transmission buffer, wherein data transfers between the reception buffer and the transmission buffer are controlled by modifying a time at which an acknowledgement of a data packet transmitted by a source on the second network and received by the gateway is generated by the gateway and sent by the gateway to the source on the second network, wherein the data packet is addressed to a receiver on the first network, wherein the gateway is a device that is separate from the receiver on the first network, wherein the first flow condition comprises congestion on the first network;

wherein acknowledgments are generated and transmitted to the source on the second network in response to transferring to the transmission buffer data packets originating the generation and sending of acknowledgments by the gateway.

14. The method of claim 13, wherein the modulating step comprises modifying a round trip time observed by the source on the second network when the source is sending packets to the gateway.

15. The method of claim 14, wherein the modulating step comprises modifying the round trip time by generating and sending the acknowledgement, wherein the acknowledgement is delayed according to an acknowledgement (ACK) delay, wherein the ACK delay is calculated based at least in part upon buffer occupancy of the transmission buffer of the gateway, wherein the acknowledgement is a single acknowledgement.

16. The method of claim 13, wherein the first network is based on a protocol selected from the group consisting of a Fibre Channel protocol, a TCP/IP protocol and an IEEE 802.2 protocol.

17. The method of claim 13, wherein the modulating step comprises modifying a window size based in part upon buffer occupancy of the transmission buffer of the gateway, wherein the gateway modifies the window size by sending a single acknowledgement to the source on the second network, wherein the single acknowledgement indicates that the window size should be reduced.

18. The method as recited in claim 17, wherein the single acknowledgement indicates a desired set of window parameters.

19. The method of claim 13, wherein the modulating step comprises generating and sending three or more acknowledgments by the gateway to the source on the second network for a single data packet that has previously been received by the gateway from the source on the second network.

20. The method of claim 13, wherein the first network is not a TCP/IP network.

21. A gateway for controlling traffic between a first network and a second network, the second network comprising a TCP/IP network, the gateway comprising:

a processor; and a memory, at least one of the processor or the memory being configured for:

determining by a processor of the gateway a first flow condition of the first network, the gateway having a transmission buffer for first data awaiting transmission on the first network; and a reception buffer that receives second data from the second network, wherein the gateway determines the first flow condition of the first network by inspecting the transmission buffer for packets awaiting transmission on the first network; and modulating a second flow condition of the second network responsive to the first flow condition by controlling data transfers between the reception buffer and the transmission buffer, wherein data transfers between the reception buffer and the transmission buffer are controlled by modifying a window size of a TCP connection originated by a source on the second network by generating and sending one or more acknowledgments by the gateway to the source on the second network for a single data packet that has previously been received by the gateway from the source on the second network, the window size being used to control a transmission of packets to the gateway, wherein the data packet is addressed to a receiver on the first network, wherein the gateway is a device that is separate from the receiver on the first network, wherein the first flow condition comprises congestion on the first network;

wherein the acknowledgments are generated and transmitted to the source on the second network in response to transferring to the transmission buffer packets originating the generation and sending of the acknowledgments by the gateway.

22. The gateway of claim 21, wherein the first network is not a TCP/IP network.

23. A non-transitory computer program embodied in a machine-readable medium, the computer program controlling a gateway between a first network and a second network, the second network comprising a TCP/IP network, the computer program controlling the gateway to perform the following steps:

determine by the gateway a first flow condition of the first network, the gateway having a transmission buffer for first data awaiting transmission on the first network; and a reception buffer that receives second data from the second network, wherein the gateway determines the first flow condition of the first network by inspecting the transmission buffer for packets awaiting transmission on the first network; and modulate by the gateway a second flow condition of the second network responsive to the first flow condition by controlling data transfers between the reception buffer and the transmission buffer, wherein data transfers between the reception buffer and the transmission buffer are controlled by modifying a window size of a TCP connection originated by a source on the second network by generating by the gateway and sending by the gateway one or more acknowledgments for a single data packet that has previously been received by the gateway from the source on the second network, wherein the data packet is addressed to a receiver on the first network, wherein the gateway is a device that is separate from the receiver on the first network, the window size being used to control a transmission of packets to the gateway, wherein the first flow condition comprises congestion on the first network, wherein the first network is not a TCP/IP network;

wherein the acknowledgments are generated and transmitted to the source on the second network in response to transferring to the transmission buffer packets originating the generation and sending of the acknowledgments by the gateway.

24. A system for regulating traffic between computer networks, the system comprising:

at least one node of a second network, the second network comprising a TCP/IP network; and a gateway for controlling traffic between a first network and the second network, the gateway comprising:

means for determining a first flow condition of the first network, the gateway having a transmission buffer for first data awaiting transmission on the first network; and a reception buffer that receives second data from the second network, wherein the gateway determines the first flow condition of the first network by inspecting the transmission buffer for packets awaiting transmission on the first network; and means for modulating a second flow condition of the second network responsive to the first flow condition by controlling data transfers between the reception buffer and the transmission buffer, wherein data transfers between the reception buffer and the transmission buffer are controlled by modifying a window size of a TCP connection originated by a source on the second network by generating and sending one or more acknowledgments for a single data packet that has previously been received by the gateway from the source on the second network, wherein the data packet is addressed to a receiver on the first network, wherein the gateway is a device that is separate from the receiver on the first network, the window size being used to control a transmission of packets to the gateway, wherein the first flow condition comprises congestion on the first network;

wherein the acknowledgments are generated and transmitted to the source on the second network in response to transferring to the transmission buffer packets originating the generation and sending of the acknowledgments by the gateway.

25. The system of claim 24, wherein the first network comprises a Fibre Channel network.

26. The system of claim 24, wherein the first flow condition is determined, at least in part, by an occupancy of the transmission buffer within the gateway.

27. The computer program of claim 24, wherein the first network is not a TCP/IP network.

28. A method, comprising:

determining by a gateway a first flow condition of a first network, the gateway being between the first network and a second network, the second network comprising a TCP/IP network, the gateway having a transmission buffer for first data awaiting transmission on the first network; and a reception buffer that receives second data from the second network, wherein the gateway determines the first flow condition of the first network by inspecting the transmission buffer for packets awaiting transmission on the first network; and modulating by the gateway a second flow condition of the second network responsive to the first flow condition by controlling data transfers between the reception buffer and the transmission buffer, wherein data transfers between the reception buffer and the transmission buffer are controlled by modifying a window size of a TCP connection originated by a source on the second network by generating by the gateway and sending by the gateway one or more acknowledgments for a single data packet that has previously been received by the gateway from the source on the second network, wherein the data packet is addressed to a receiver on the first network, wherein the gateway is a device that is separate from the receiver on the first network, the window size being used to control a transmission of packets to the gateway, wherein the first flow condition comprises congestion on the first network;

wherein the acknowledgments are generated and transmitted to the source on the second network in response to transferring to the transmission buffer data packets originating the generation and sending of the acknowledgments by the gateway.

29. The method of claim 28, wherein the first network is not a TCP/IP network.

30. A non-transitory computer-readable medium storing thereon computer-readable instructions for coordinating flow control between networks, comprising:

instructions for determining by a gateway a first flow condition of a first network in communication with a second network via the gateway, the second network comprising a TCP/IP network, the gateway having a transmission buffer for first data awaiting transmission on the first network; and a reception buffer that receives second data from the second network, wherein the gateway determines the first flow condition of the first network by inspecting the transmission buffer for packets awaiting transmission on the first network; and instructions for modulating by the gateway a second flow condition of the second network responsive to the first flow condition by controlling data transfers between the reception buffer and the transmission buffer, wherein data transfers between the reception buffer and the transmission buffer are controlled by generating by the gateway and sending by the gateway one or more acknowledgments to a source on the second network for a data packet that has previously been received by the gateway from the source on the second network, wherein the data packet is addressed to a receiver on the first network, wherein the gateway is a device that is separate from the receiver on the first network, wherein the first flow condition comprises congestion on the first network;

wherein the acknowledgments are generated and transmitted to the source on the second network in response to transferring to the transmission buffer data packets originating the generation and sending of the acknowledgments by the gateway.

31. The computer-readable medium of claim 30, wherein the instructions for modulating comprise instructions for generating and sending three or more acknowledgments by the gateway to the source on the second network for a single data packet that has previously been received by the gateway from the source on the second network.

\* \* \* \* \*